No. 818,805. PATENTED APR. 24, 1906.
B. ADRIANCE & A. CALLESON.
CAN MAKING MACHINE.
APPLICATION FILED APR. 1, 1902.

12 SHEETS—SHEET 5.

Witnesses:
Geo. L. Wheelock
Richard S. Harvey

Inventors,
Benjamin Adriance,
Amos Calleson,
by Samuel W. Balch
Attorney.

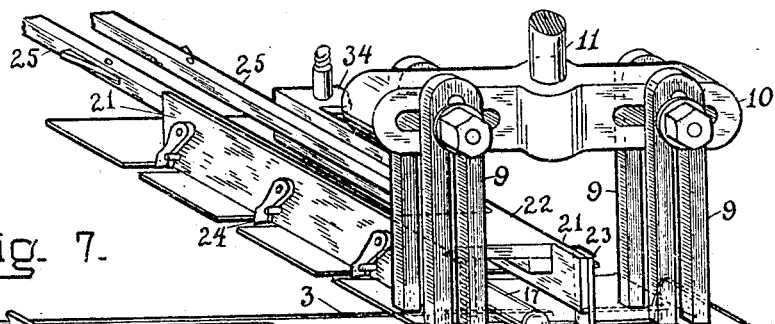
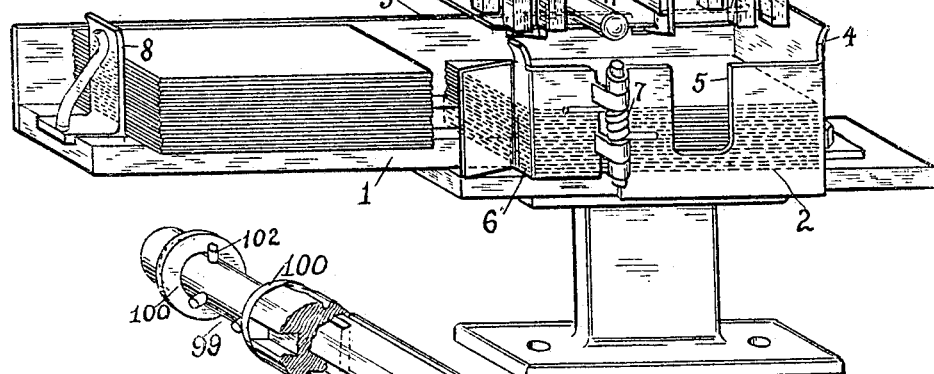
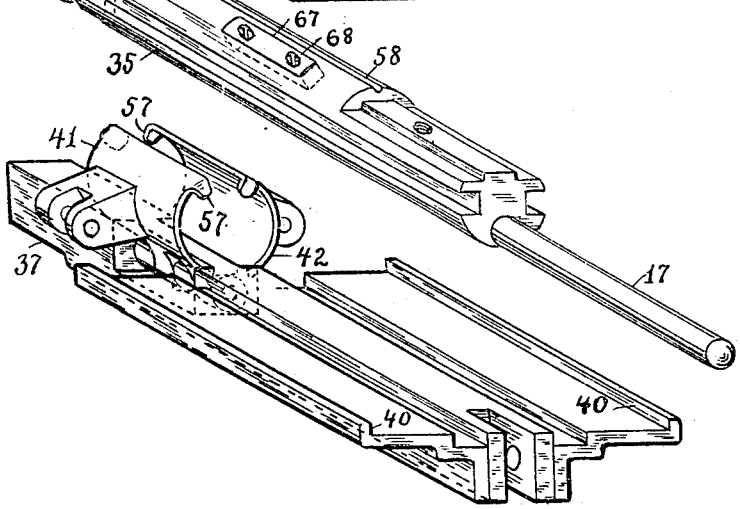

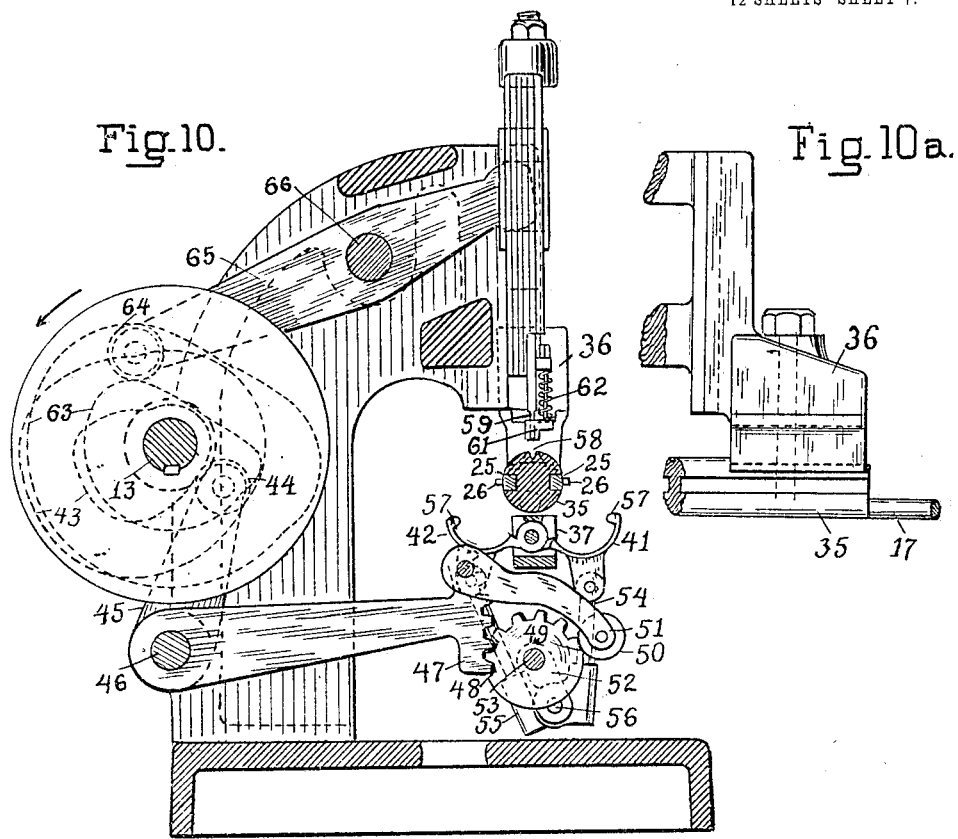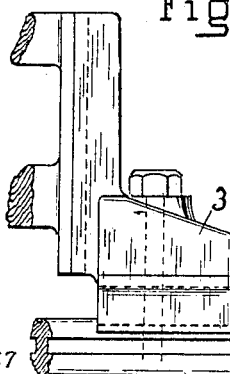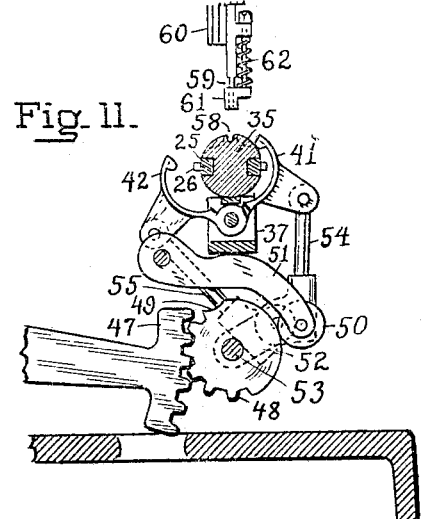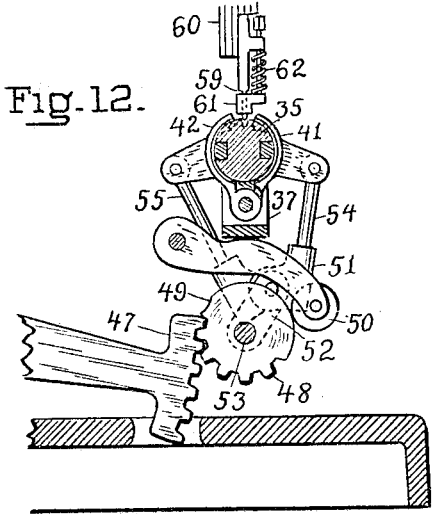

No. 818,805. PATENTED APR. 24, 1906.
B. ADRIANCE & A. CALLESON.
CAN MAKING MACHINE.
APPLICATION FILED APR. 1, 1902.

12 SHEETS—SHEET 8.

Witnesses:
Geo. L. Wheelock
Richard L. Harvey

Inventors,
Benjamin Adriance.
Amos Calleson.
by Samuel W. Balch
Attorney.

No. 818,805. PATENTED APR. 24, 1906.
B. ADRIANCE & A. CALLESON.
CAN MAKING MACHINE.
APPLICATION FILED APR. 1, 1902.

12 SHEETS—SHEET 9.

Witnesses:
Geo. L. Wheelock
Richard S. Harvey

Inventors,
Benjamin Adriance,
Amos Calleson,
by Samuel W. Balch
Attorney

No. 818,805. PATENTED APR. 24, 1906.
B. ADRIANCE & A. CALLESON.
CAN MAKING MACHINE.
APPLICATION FILED APR. 1, 1902.

12 SHEETS—SHEET 11.

Witnesses:
Geo. L. Wheelock
Richard S. Harvey

Inventors,
Benjamin Adriance,
Amos Calleson,
by Samuel W. Balch
Attorney.

No. 818,805. PATENTED APR. 24, 1906.
B. ADRIANCE & A. CALLESON.
CAN MAKING MACHINE.
APPLICATION FILED APR. 1, 1902.
12 SHEETS—SHEET 12.
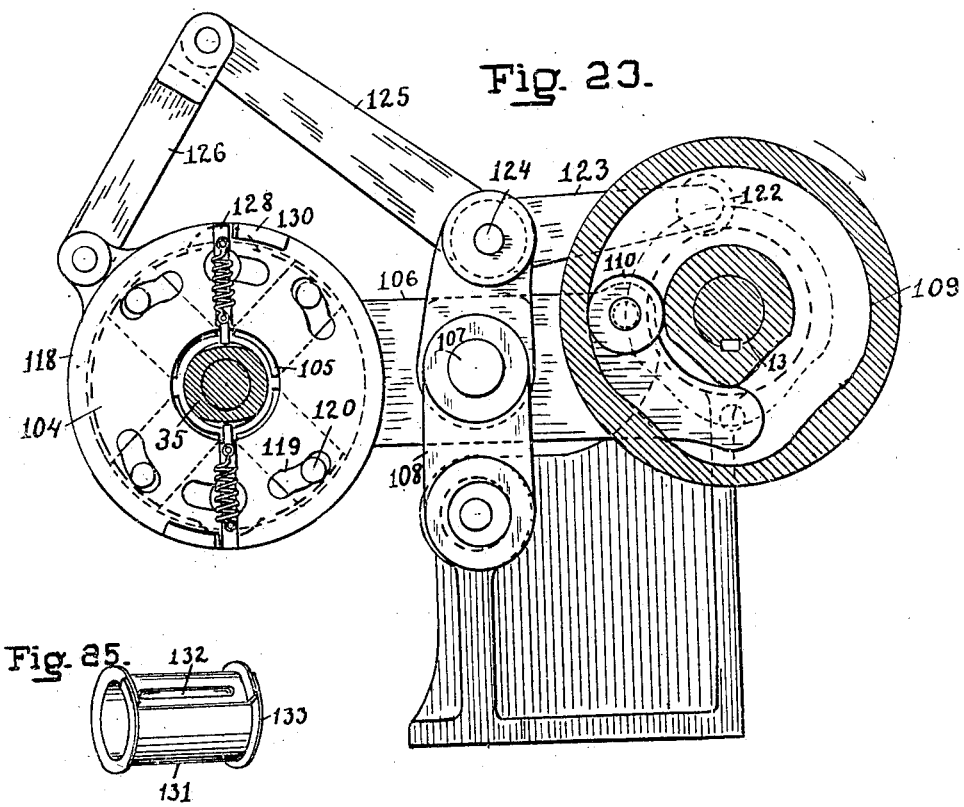
Fig. 23.
Fig. 25.
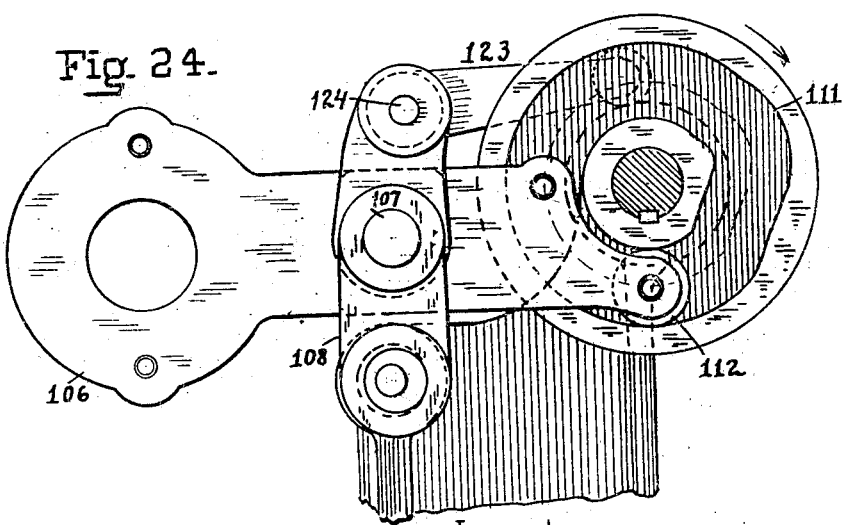
Fig. 24.
Witnesses:
Geo. L. Wheelock
Richard S. Harvey
Inventors,
Benjamin Adriance,
Amos Calleson,
by Samuel W. Balch
Attorney.

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

CAN-MAKING MACHINE.

No. 818,805.　　　　Specification of Letters Patent.　　　Patented April 24, 1906.

Application filed April 1, 1902. Serial No. 101,003.

*To all whom it may concern:*

Be it known that we, BENJAMIN ADRIANCE and AMOS CALLESON, citizens of the United States of America, and residents of the borough of Brooklyn, in the county of Kings, city of New York, and State of New York, have invented certain new and useful Improvements in Can-Making Machines, of which the following is a specification.

The machine herein shown and described, which embodies our invention, as hereinafter claimed, automatically picks up can-body blanks from a pile of blanks placed at one end of the machine and successively forms the blanks around a horn into a can-body with overlapping ends and matching beads and grooves in the lapped ends, solders these ends, and flanges outwardly the ends of the can-bodies. Suitable feed devices feed the blanks, the partially-formed and formed can-bodies to and from the different places in the machine where the above-mentioned operations take place, and confining-fingers, which are believed to be novel in a body-forming machine, as hereinafter claimed, hold the lapped ends of the can-body together during its passage from the place on the horn where it is formed and during its passage under the soldering devices to the place on the horn where the ends of the can-body are flanged.

Figure 1:
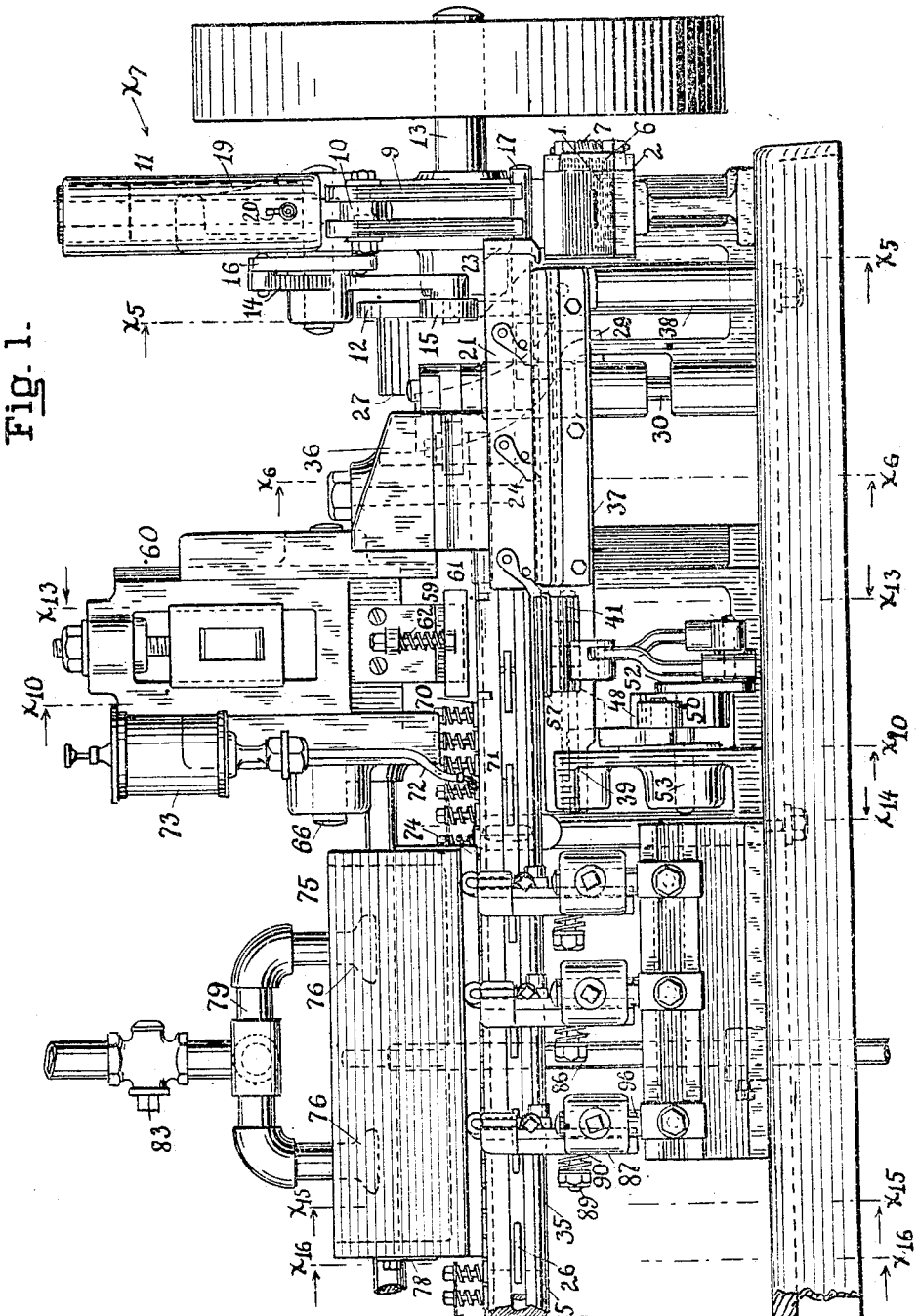
Figure 2:
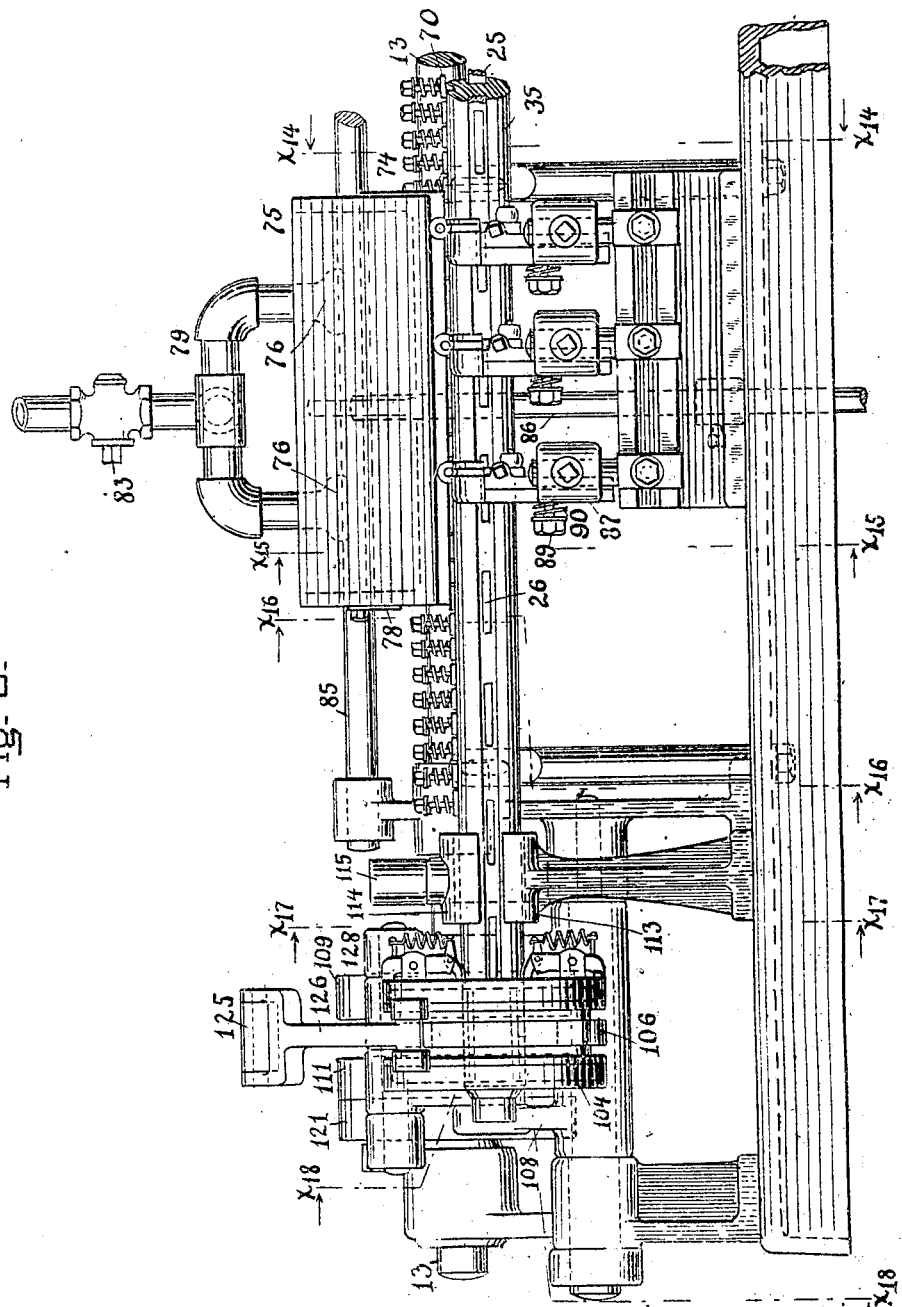
Figure 3:
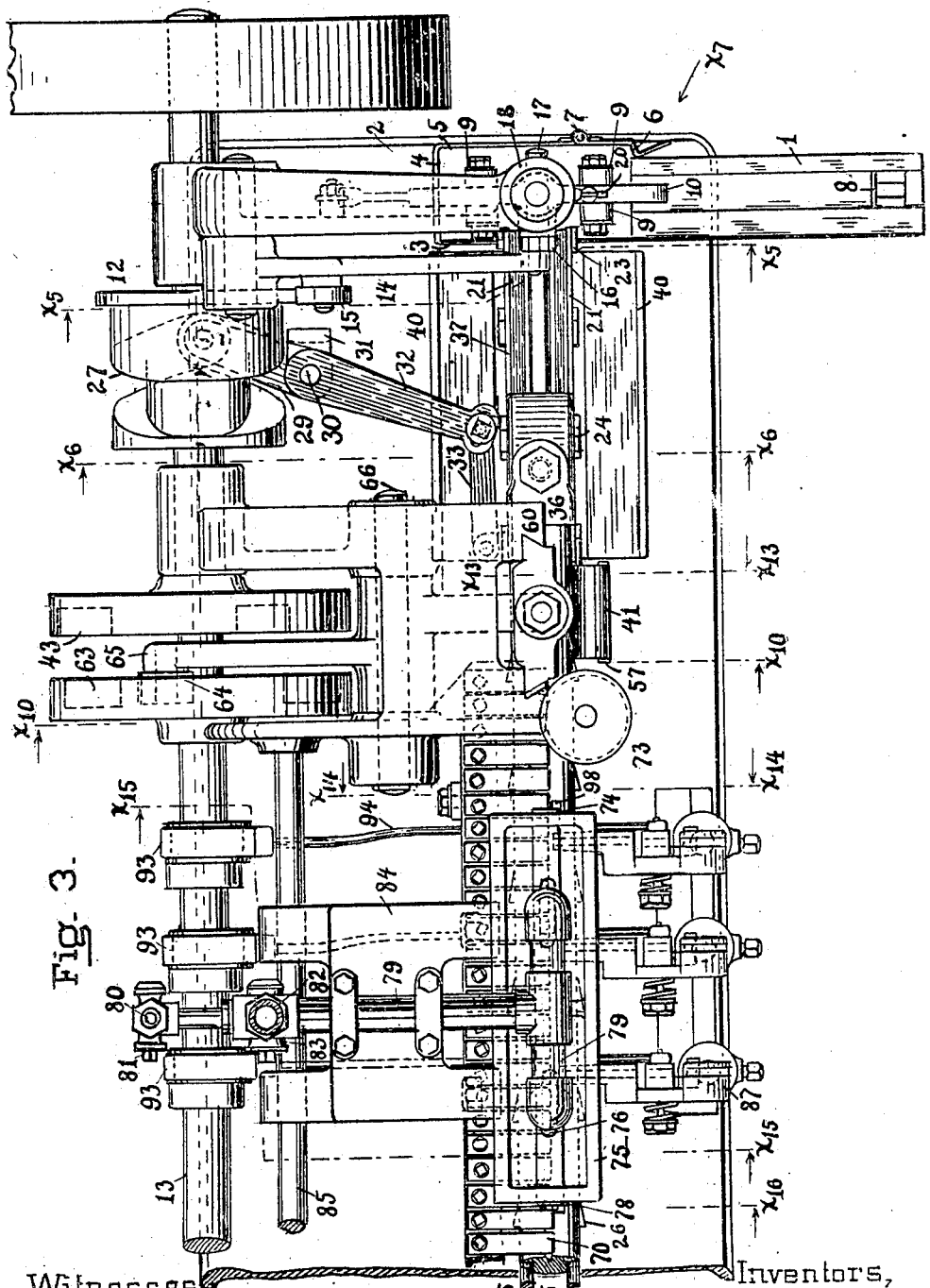
Figure 4:
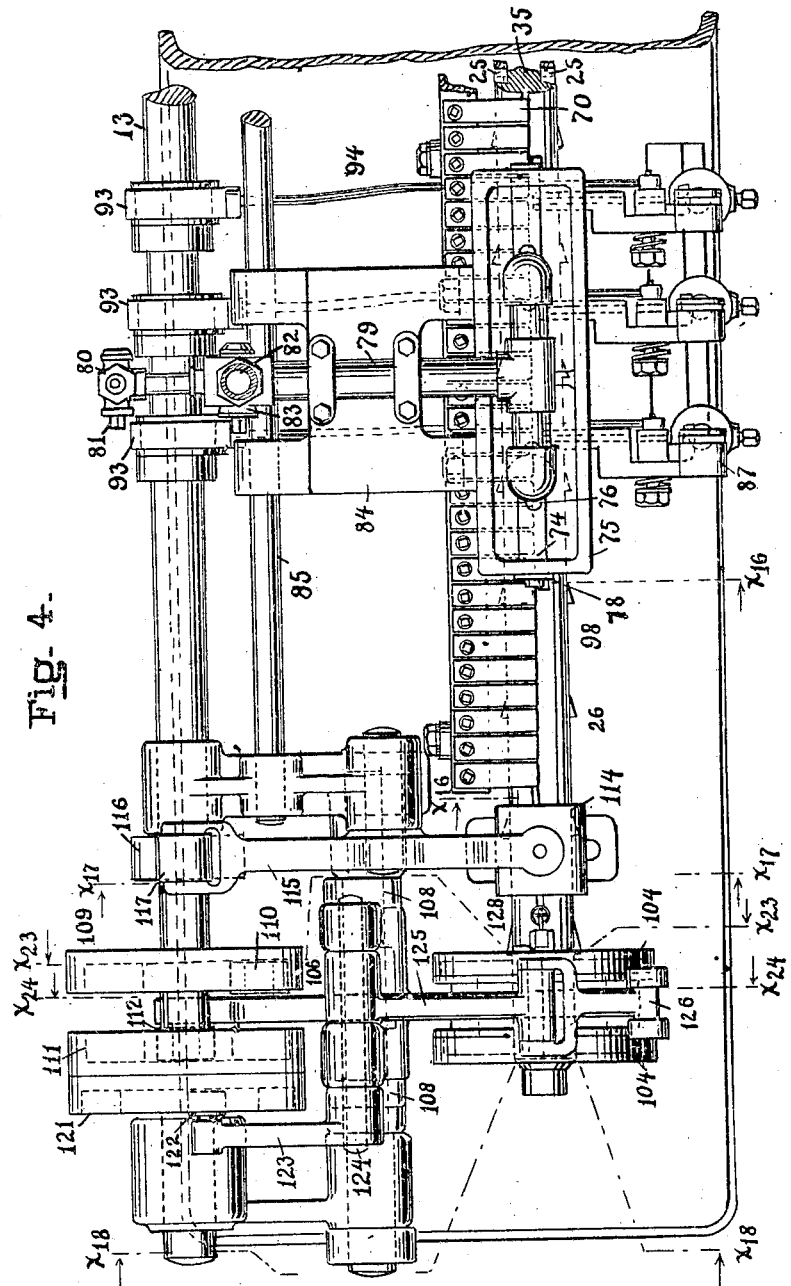
Figure 5:
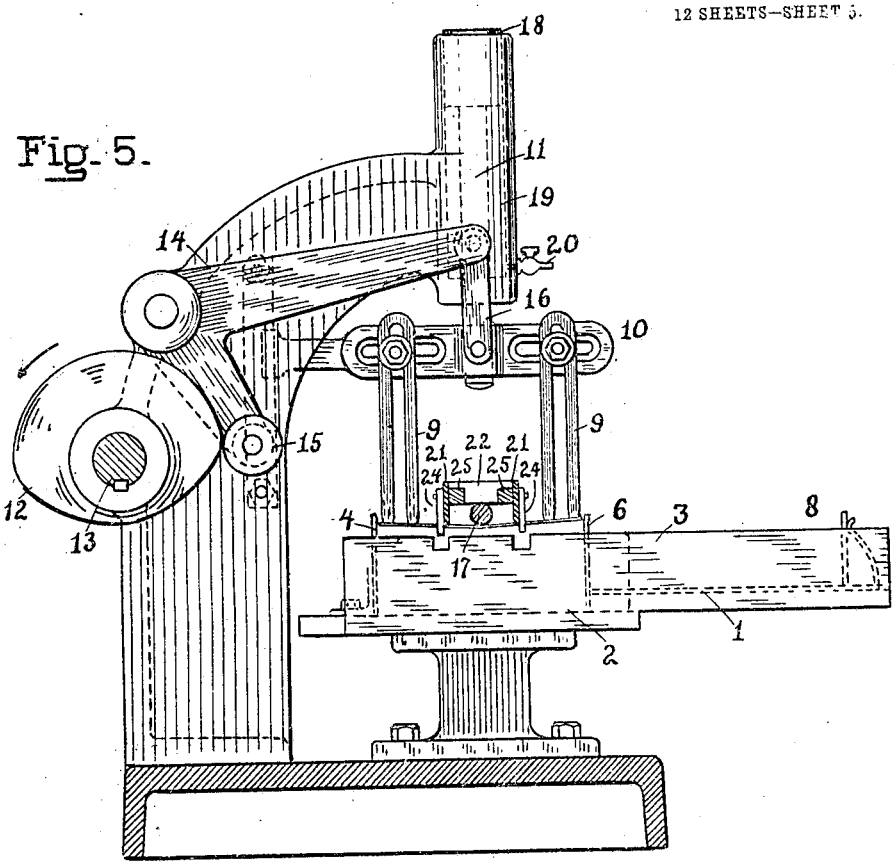
Figure 6:
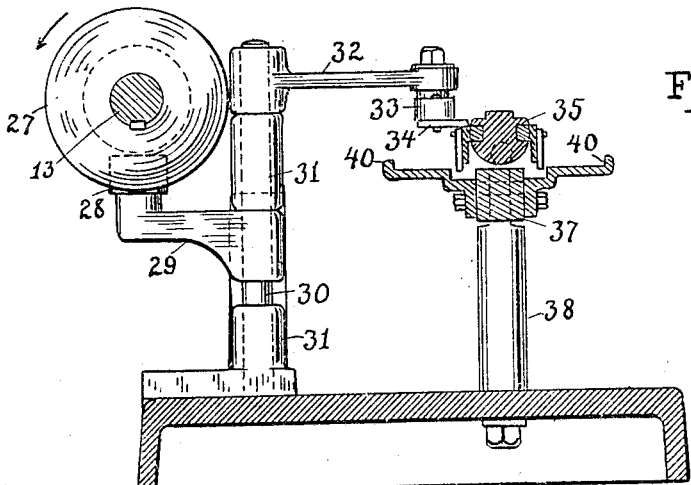
Figure 13:
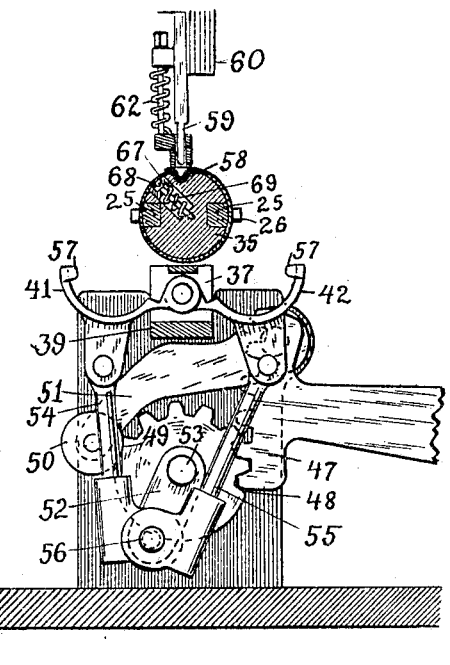
Figure 14:
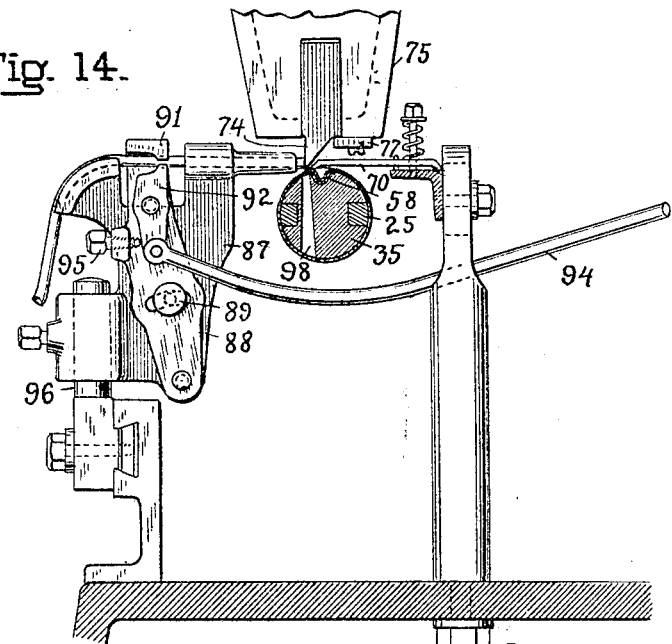
Figure 15:
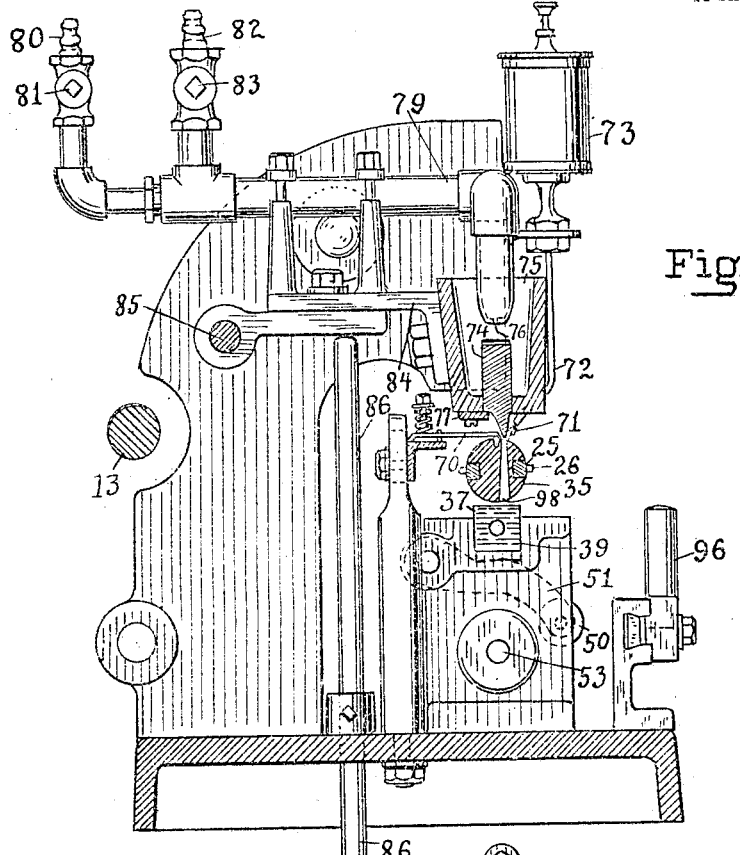
Figure 16:
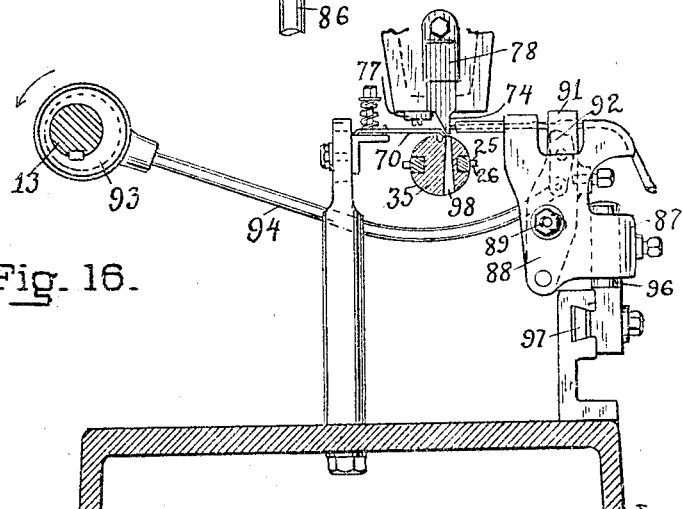
Figure 17:
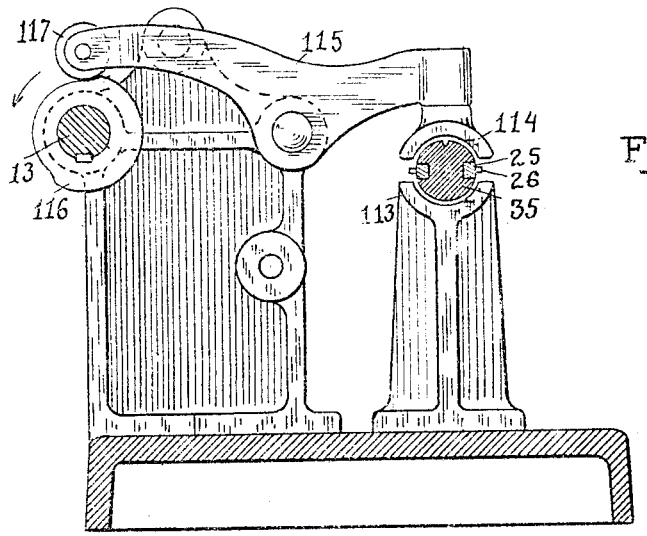
Figure 18:
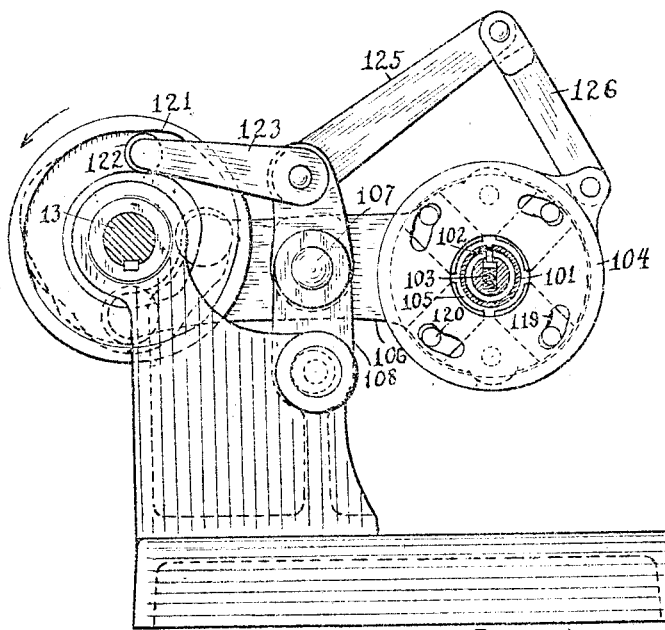

In the accompanying twelve sheets of drawings, which form a part of this specification, Figure 1 is an elevation showing that part of the machine which picks up the can-body blanks, forms the blanks into can-bodies, and solders the overlapping ends of the blanks. Fig. 2 is an elevation showing that part of the machine which solders the overlapping ends of the blanks and flanges outwardly the ends of the can-bodies. Fig. 3 is a plan showing the parts illustrated in Fig. 1. Fig. 4 is a plan showing the parts illustrated in Fig. 2. Fig. 5 is a vertical section on the lines $x^5$ $x^5$ of Fig. 1 and Fig. 3 looking in the direction of the arrows, showing the mechanism for picking up the can-body blanks from a pile of blanks. Fig. 6 is a vertical section on the lines $x^6$ $x^6$ of Fig. 1 and Fig. 3 looking in the direction of the arrows, showing the feeding devices. Fig. 7 is a perspective view looking in the direction of the arrows $x^7$ $x^7$ of Figs. 1 and 3, showing the pick-up mechanism and feeding devices. Fig. 8 is a perspective from the same point of view, showing the horn with the cushion-sleeve omitted. Fig. 9 is a perspective from the same point of view, showing the clamping-bar, guides for the body-blanks attached to the clamping-bar, and folding-dies, hinged to the clamping-bar. Fig. 10 is a vertical section on the lines $x^{10}$ $x^{10}$ of Figs. 1 and 3 looking in the direction of the arrows, showing the mechanism for forming the blanks around the horn into a can-body with lapping ends and matching beads and grooves in the lapped ends, the folding-dies being open and the bead and groove forming mechanism being lifted away from the horn to the position occupied after the blank has been fed and is about to be folded around the horn. Fig. 10ᵃ is a detail showing the connection of the horn to the framework of the machine. Fig. 11 is a similar section showing the folding-dies partially operated. Fig. 12 is a similar section showing the folding-dies fully operated. Fig. 13 is a vertical section on the lines $x^{13}$ $x^{13}$ of Fig. 1 and Fig. 3 looking in the direction of the arrows and in the opposite direction to Fig. 10, Fig. 11, and Fig. 12, showing the folding-dies open and the confining-piece of the bead and groove forming mechanism in the position occupied when the formed can-body is being fed from the position where it is formed. Fig. 14 is a vertical section on the lines $x^{14}$ $x^{14}$ of Fig. 1 and Fig. 3 looking in the direction of the arrows, drawn to the scale of Fig. 13, showing the confining-fingers, the solder-feeding mechanism, soldering-iron, and heating-box. Fig. 15 is a vertical section on the lines $x^{15}$ $x^{15}$ of Fig. 1 and Fig. 3 looking in the direction of the arrows, showing the guide for the end of the clamping-bar and support for the mechanism for operating the clamping-bar and folding-dies, the confining-fingers, the cup for flux, the soldering-iron, heating-box, and burner. Fig. 16 is a vertical section on the lines $x^{16}$ $x^{16}$ of Figs. 1, 2, 3, and 4 looking in the direction of the arrows, showing the confining-fingers, the solder-feeding mechanism, soldering-iron, and heating-box. Fig. 17 is a vertical section on the lines $x^{17}$ $x^{17}$ of Figs. 2 and 4 looking in the direction of the arrows, showing the steadying device for the horn adjoining the flanging mechanism. Fig. 18 is a vertical section on the lines $x^{18}$ $x^{18}$ looking in the direction of the arrows, of Figs.

Figure 19:
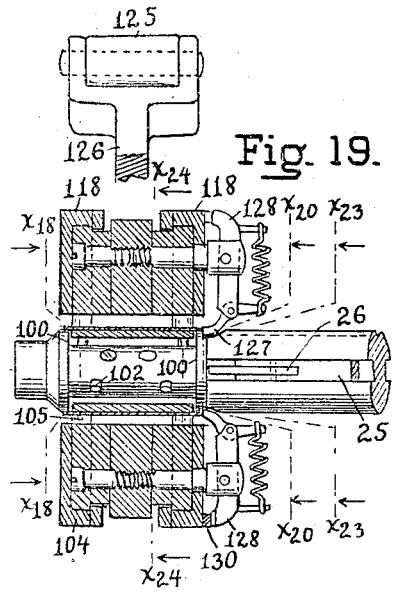
Figure 20:
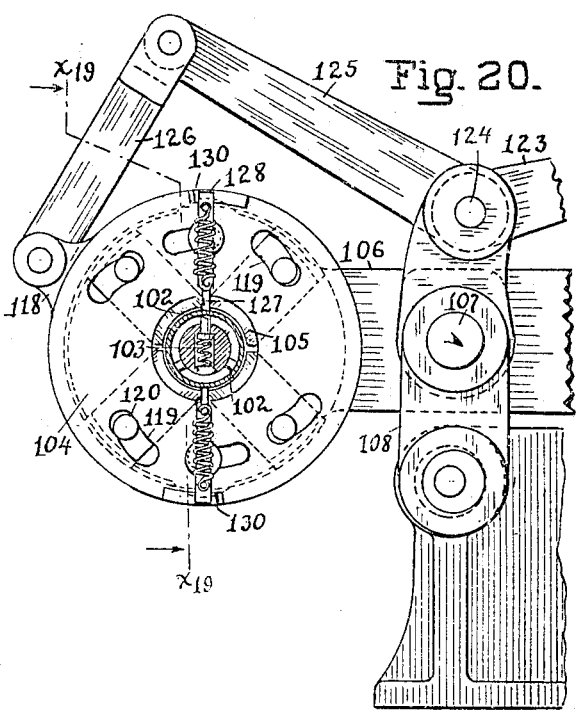
Figure 21:
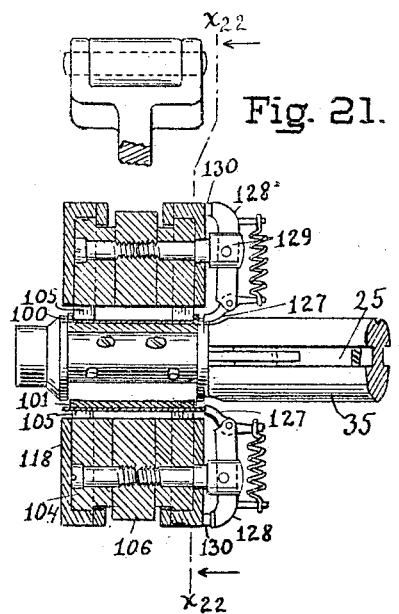
Figure 22:
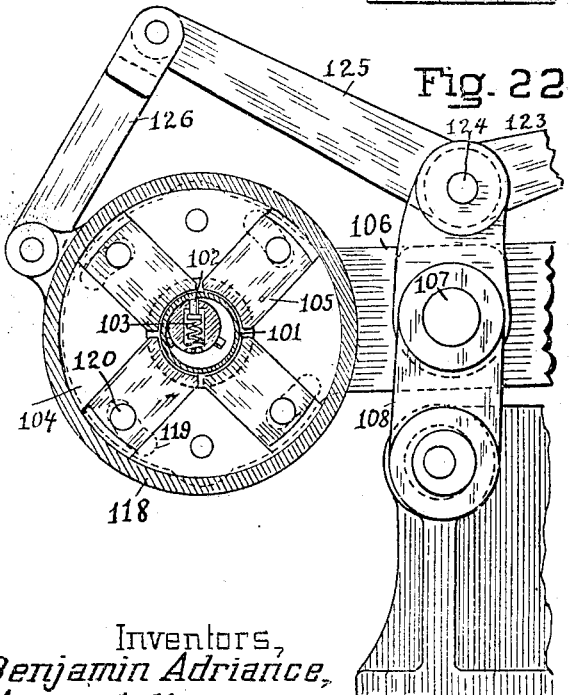

4, and 19, showing the flanging mechanism with the chucks open. Fig. 19 is a longitudinal section on the lines $x^{19}$ $x^{19}$ of Fig. 20 looking in the direction of the arrows, drawn to a larger scale, showing the chuck, gaging-fingers, and portion of the horn with flanging-shoulders and cushion sleeve, with the axes of the chuck and horn coincident and the chuck closed and a can-body between the chuck and horn. Fig. 20 is a vertical section on the lines $x^{20}$ $x^{20}$ of Fig. 19, drawn to the same scale as Fig. 19, showing the same parts except the can-body. Fig. 21 is a longitudinal section similar to Fig. 19, but showing the axes of the chuck and horn eccentric and a can-body partially flanged. Fig. 22 is a vertical section similar to Fig. 20 on the lines $x^{22}$ $x^{22}$ of Fig. 21 looking in the direction of the arrows and showing the chuck and horn eccentric. Fig. 23 is a vertical section on the lines $x^{23}$ $x^{23}$ of Figs. 4 and 19, showing the flanging mechanism with the chuck open and one of the coöperating cams for producing a circular vibratory motion of the chuck. Fig. 24 is a vertical section on the lines $x^{24}$ $x^{24}$ of Figs. 4 and 19, omitting the chuck and showing the other coöperating cam for producing a circular vibratory motion of the chuck. Fig. 25 is a perspective view of the flanged can-body produced by the machine.

The machine is supplied with sheet-metal blanks of the proper size for formation into can-bodies. These are placed on a support 1 at one end of the machine and at one side of the line of mechanism by which the blanks are fed to the machine and operated upon. This support holds a pile of blanks which are in reserve and is not obstructed by any automatic device for taking the blanks from the pile and feeding them into the machine; but at the side of this support and in line with the support and also in line with the mechanism by which the blanks are fed to the machine and are operated upon is a second support 2. This second support is on a lower level than the other support. Guides 3, 4, 5, and 6 surround the sides of the second support and confine the pile of blanks on this support. Between the two supports is a passage-way, stepped by reason of the difference in level of the two supports, through which the pile of blanks can be transferred from the first support to the second support when the guide 6 is out of the way. This guide is formed of a piece of sheet metal with two vertical folds, as shown in Fig. 3. Viewed in the direction of Fig. 7, the section to the left forms a beveled latch which is hinged to the guide 5 and is held in place by a spring 7. On the first support the blanks can be piled up by the attendant without reference to the quantity of blanks which may be on the other support or the timing of the mechanism of the machine when it is running. When the top of the pile of blanks on the second support is below the level of the first support, the attendant, at convenience and before the blanks are entirely taken from the second pile, pushes the pile of blanks from the first support to the second support. This must be done when the devices for automatically taking the blanks from the pile are lifted and out of the way. An angle-plate, 8 provided with a handle, is conveniently used by the attendant in pushing the pile of blanks off from the first support and onto the second support.

Above the second support are four horseshoe-magnets 9, forming a pick-up mechanism. These are adjustably clamped on a crossbar 10. Two of the magnets pick up the blanks near one end, and the other two magnets pick up the blanks near the other end. The crossbar is attached to the lower end of the vertical rod 11 and means are provided for lifting and lowering the pick-up mechanism. These means are the cam 12 on a suitably-driven cam-shaft 13 and the transmitting mechanism consisting of the angle-lever 14, with a cam-roller 15 bearing against the cam on one arm of the lever and a link 16 connecting the other arm of the lever with the bar to which the magnets are attached. The cam lifts the magnets and they fall by gravity when the cut-away side of the cam is opposite the cam-roller. The magnets at each revolution of the machine are lifted to a fixed height, which is slightly above the under side of a stop 17 for the blanks and midway between the magnets which seize the blanks near one end and the magnets which seize the blanks near the other end. This stop is fixed in relation to the mechanism, and the manner in which it is supported will be pointed out later. It causes each blank to curve slightly as it is picked up, and the pick-up mechanism reaches the highest point of its movement. The purpose of this is in case more than one blank should be picked up at the same time by the magnets to separate and dislodge the additional blank if two blanks should adhere together. This adhesion is broken because they must slip on each other in curving. At the upper end of the rod which supports the cross-bar of the pick-up mechanism is a piston 18 in an air-chamber 19, supported by the framework of the machine. There is an adjustable vent 20 to this air-chamber, and by adjusting this the approach of the magnets to the blanks can be made as gradual and with as little shock as is desired. This is important because a too sudden seizing and pounding of the blanks by the magnets weakens the strength of the magnetism. When the pick-up mechanism is in its raised position, the blank carried thereby is opposite feeding devices which remove the blank horizontally from the magnets. These horizontally-feeding devices are two parallel plates 21, placed side by side, joined together by a transverse piece 22 and carrying a pair of rigidly-attached feeding-fingers 23, which engage the blank which is picked up by the magnets, and a series of pivoted feeding-fingers 24, which effect the further feeding of the blank.

Two rods 25 are attached to the facing-surfaces of the plates and carry other pivoted feeding-fingers 26, which feed the can-bodies. The feeding mechanism is operated by a cam 27, which engages the cam-roller 28 on an arm 29. This arm is attached to a vertical shaft 30, which is supported in brackets 31. Another arm 32, also attached to this shaft, is connected, through a link 33, with a bracket 34, projecting from one of the plates of the feeding devices. The feeding devices are guided in their horizontal movement by two grooves in a horn 35, which receive the rods 25. The horn is rigidly bolted at one end to a lug 36, cast on the side of the right-hand way for the slide shown in Fig. 10, and the stop 17 is rigidly fixed in the end of the horn. The other end of the horn is not attached to the frame of the machine, but is free, so that the can-bodies formed thereon can be slipped off.

Underneath the horn is a clamping-bar 37, which is pivoted at one end to a stud 38 and is guided at the other end in a notch 39 in a part of the framework of the machine. The blanks are fed between the clamping-bar and the horn. Guides 40 for the blanks are attached to and supported by the clamping-bar. These guides, in addition to supporting the blanks that are being fed, guide the ends of the blanks. The vertical movement of the clamping-bar is so slight that the guides do not move out of place materially with the operation of the clamping-bar. The clamping-bar also supports a pair of curved forming-dies 41 42, the forming-dies being hinged to the clamping-bar. As the forming-dies are operated only when the clamping-bar is against the horn, this support for the forming-dies is always in the same position when they are to be operated and is as suitable as though it were a fixed support. The operation of the clamping-bar is effected by a cam 43 on the cam-shaft. This cam engages a cam-roller 44 on the end of an arm 45, which is made fast to a shaft 46. Attached to this shaft is a gear-segment 47, which engages with a gear-segment 48, on which is a cam 49. The gear-segment 48 and cam 49 are formed from one circular piece of metal, the gear-teeth occupying part of the circumference and the cam-surface the remainder. The cam acts on a roller 50 at the end of a lever 51, which lies under the clamping-bar. The cam-surface is at a fixed distance from the axis with the exception of that portion which lies under the roller when the cam is in its initial position. (Shown in Fig. 10.) In this position the cam-roller rests in the notch 49, and the clamping-bar is allowed to fall away from the horn, so as to leave sufficient space between it and the horn for the passage of a can-body blank or can-body.

A lever 52 is rigidly connected to the cam and gear-segment, and both operate on a common pivot 53. Links 54 and 55 connect, respectively, the curved forming-dies 41 and 42 with a common pivot 56 on the lever. The parts are so arranged and proportioned that when the dies are closed around the horn the fulcrum 53 of the lever will be approximately on a projection of a right line passing through the ends of the link 54, connected to the die 41, and when the dies are open the fulcrum 53 of the lever will be approximately on a right line passing through the ends of the link 55, connected to the die 42, and between the ends of the link. By reason of the arrangement and proportion of the lever and links and their connection to the forming-dies the die 41 is operated more rapidly at the beginning than at the end of its movement toward the horn, while the die 42 is operated more slowly at the beginning than at the end of its movement toward the horn. In consequence, although they are both operated by the movement of the same lever and are connected to the lever at the same point and the operation of both begins and ends at the same time one will be operated farther than the other at all intermediate points of operation, as shown in Fig. 11, and this will insure the proper lapping of the ends of the blank at the top of the horn. Guiding-lugs 57 project inwardly toward the horn at the two outer corners of each of the forming-dies and insure the proper positioning of the blank as it is being folded around the horn. Suitable notches are provided in the horn in which the lugs enter when the forming-dies are closed around the horn.

A longitudinal guiding-groove 58 adjoins the lapped ends of the blank when it is folded around the horn and is preferably formed in the top of the horn. A punch 59 is attached to the lower end of a vertical slide 60, which is guided in the framework of the machine. The punch mates with the groove in the horn and when closed against the horn forms matching beads and grooves in the lapped ends of the formed can-body. The punch passes through an opening in a confining-piece 61, the bottom of which is normally slightly below the end of the punch. The confining-piece is supported from the slide and is normally held in this position by a spring 62. The punch is operated by a cam 63, attached to the cam-shaft. This cam engages a cam-roller 64 on one end of the lever 65, fulcrumed to the frame by a shaft 66 and engaging at its other end with the punch-slide. When the blank has been folded around the horn by the forming-dies, the punch is forced downward and forms the matching bead and groove in the lapped ends of the blank. The forming-dies then open and the punch is lifted, but not sufficiently to lift the confining-piece which surrounds the punch away from engagement with the lapped ends, and it confines them against the horn without clamping them tightly to the horn. The bead and the groove in the lapped ends of the blank are thereby held in engagement by the confining-piece, and the formed can-body is kept in shape and the lapped ends are kept together by the confining-piece while the feeding mechanism operates and pushes it along the horn from the place where it was formed and brings another blank in its place for forming.

In order to prevent the blank from being drawn too tightly over the horn and causing it to bind, so that it cannot be removed by the feeding mechanism, a mortise is formed in the horn, and a pad 67 is set in the mortise and held therein by screws 68. Heavy springs 69 are placed in the mortise and press the pad outwardly. The heads of the screws permit the surface of the pad to project slightly above the margins of the mortise. The springs under the pad hold it in place while the can-body is being formed over it and are of such strength that the can-body will bend over the pad without depressing it. Consequently the amount that the pad projects above the surface of the horn can be adjusted and the size of the can-body slightly altered thereby. The pad, however, will yield slightly, if necessary, when the matching bead and groove is formed, and the tension which may be set up in the can-body cannot exceed the strength of the springs under the pad and be great enough to bind the can-body on the horn, so that the feeding mechanism cannot remove it.

The lapped ends of the formed can-body are permanently connected by soldering, and soldering devices are provided for this purpose. The horn extends past these soldering devices and the can-bodies are fed along the horn between the place where they are formed and the soldering devices and past the soldering devices. While being fed, the matching beads and grooves are held in engagement and the formed can-body is kept in shape after it passes from under the confining-piece at the punch by confining-fingers 70, which press downward against the upper of the lapped ends and hold the bead and groove in engagement.

The can-bodies in passing to the soldering device are fluxed at the seam where they are to be soldered. This flux is supplied by a wick 71 at the lower end of a tube 72, which leads from a cup 73, in which the flux is contained.

The soldering device comprises a soldering-iron 74, which is supported in a heater consisting of a heating-box 75 and a burner 76, directed into the heater. The soldering-iron is an iron bar with a wedge-shaped soldering-nose at the bottom. The edge of the wedge lies parallel with and close to the top of the horn. The bottom of the heating-box is notched, and the soldering-iron fits loosely in the notch. It is supported by a strip 77, which is screwed to the box and projects under a corner of the soldering-iron. A strip 78, also screwed to the heating-box, projects across one end of the heating-box and keeps the soldering-iron from becoming displaced endwise in the direction in which the can-bodies are fed along the horn. As shown, the soldering-iron and heating-box are of sufficient length to be in contact with two or three formed can-bodies at the same time, and the heat required by the iron necessitates two burners. Both burners are supplied with mixed air and gas from the pipe 79, which branches to the burners. The pipe is provided with a connection 80 for a rubber tube, and a cock 81, through which the gas is supplied, and is also provided with another connection 82 for another tube and a cock 83, through which air is supplied. The pipe and heating-box are securely bolted to a frame 84. This frame is hinged on a horizontal bar 85 and rests on a rod 86, so that the soldering-iron will be close to but will not rest on the horn, and when a can-body passes under the soldering-iron the iron will rest on the can-body and not on the strip screwed to the bottom of the heating-box. The frame is a common support for the burners and the box forming the heater, and they are movable together to and from the horn about their common hinged support and can be readily lifted together away from the horn for cleaning whenever desirable and upon the stopping of the machine, so that the iron need not cool while in contact with the can-bodies. This can be done by lifting the rod 86, as the heater is too hot to be touched by the hand.

Wire-solder is used in the machine and is fed against the nose of the horn by three feeding devices. Each of these feeding devices consists of a frame 87, to the lower end of which a lever 88 is fulcrumed. The lever is clamped to the frame with a bolt 89, the nut of which rests against a spring 90, and the lever consequently moves with some friction. At the upper end of the lever is a fixed jaw 91 and a pivoted jaw 92, between which the wire-solder is clamped and by which it is fed. An eccentric 93 on the cam-shaft is connected by a rod 94 with the pivoted jaw, and the combined movement of the jaw and lever is equal to the throw of the eccentric. The amount of movement of the pivoted jaw on the lever is adjusted by a screw 95, carried by the lever and having its end resting against one arm of the jaw, and thus indirectly the throw of the lever and the amount of solder fed at each revolution of the cam-shaft is adjusted. The frame of each feeding device is supported by a stud 96, on which it is vertically adjustable, and the studs are longitudinally adjustable on a grooved slide 97, forming part of the framework of the machine. A mortise 98 is cut through the horn vertically under the nose of the soldering-iron, so that in case solder should drip from the iron when there is no can-body on the horn under the iron the solder will not lodge on the horn, but will fall through the mortise.

The horn is extended beyond the soldering devices for a distance such that the time required for the can-body to be fed over this part will be sufficient to permit the solder to cool. This is usually equal to the space occupied by at least two can-bodies. The confining-fingers are continued along this portion of the horn, and their purpose is to hold the lapped ends together after the solder has been applied until it has time to set. On a further continuation of the horn through the section where the solder sets is a recess 99, forming two flanging-shoulders 100. The distance between these flanging-shoulders is less than the length of the can-body, so that the can-body can overlap both shoulders at the same time by the amount required for the flanges to be formed at both ends. There is a cushion-sleeve 101 in the recess of the same diameter as the horn. This sleeve fills the space between the flanging-shoulders and is confined by them against longitudinal movement. The thickness of the sleeve is less than the depth of the recess to allow the sleeve to be displaced transversely to a position eccentric to the horn, so that the flanging-shoulders will be exposed on any side of the horn. Near each end of the recess and projecting from the bottom of the recess is a set of three pins 102. The pins in each set are spaced equally around the horn and project in different directions. They press against the interior of the sleeve and normally hold it concentric with the horn, so that it will cover the flanging-shoulders and the can-bodies will not catch on the shoulders when they are being fed past them on the horn. The pins are normally held in the positions shown in Fig. 20, with their shoulders against the bottoms of the chambers in the horn, by springs 103, contained in chambers in the horn. Some of the pins are pressed, as shown in Fig. 22, so as to compress the springs when the cushion-sleeve is eccentric to the horn.

The horn is surrounded by two chucks 104 for holding the can-body and effecting the flanging of both ends of the can-body in coöperation with the flanging-shoulders of the horn. These chucks are provided with radial jaws 105, set in radial grooves, and the can-body is gripped between these jaws. The jaws of each of the chucks adjoin one of the flanging-shoulders of the horn. The chucks are bolted to the end of a vibrator 106 and concentric with a hole in the end of the vibrator large enough for the passage of a flanged can-body. The horn passes through the hole in the vibrator as well as through the chucks, and the axes of the chucks and horn normally coincide. The vibrator is a bar pivoted near the middle by a shaft 107 to a pair of rocker-arms 108. It is thus supported so that it can be rocked about the shaft 107 and the end to which the chucks are bolted vibrated along a substantially vertical axis, which is transverse to the axis of the horn and the chucks, while the other end vibrates oppositely. At the same time the vibrator can be vibrated horizontally as a whole in the direction of its length by reason of its being supported by the vertical rocker-arms. This vibration is also transverse to the axis of the horn and the chucks.

The horizontal vibration is effected by a cam 109, which is attached to the cam-shaft, acting on a cam-roller 110, carried by the vibrator. The cam imparts one and one-half complete vibrations during a third of a revolution and during the remainder of the revolution holds the vibrator at rest with respect to this vibration at a point midway of the vibration.

The vertical vibration of the vibrator is effected by a cam 111, which is attached to the cam-shaft, acting on a cam-roller 112, carried by the vibrator. This cam imparts one complete vibration, which commences after the other cam has made a quarter of a complete vibration and ends when the other cam has made one and one-quarter vibrations, and during the remainder of the revolution holds the vibrator at rest with respect to this vibration at a point midway of the vibration. The two cams are so positioned with respect to each other that the horizontal vibration will be commenced a quarter of a period in advance of the vertical vibration, and both vibrations are maintained a quarter of a period apart. In consequence the axis of the chucks is first displaced from its normal position, which is coincident with the axis of the horn, to a position at one side and parallel. The two vibrations together produce a resultant circular vibratory motion of the chucks, by which the axis of the chucks is shifted a complete revolution about the axis of the horn, after which the chucks are again brought to a position concentric with the horn and the axis of the chucks coincident with the axis of the horn. The chucks do not revolve bodily.

The circular vibratory motion of the chucks forces the different sides of the can-body progressively into the recess in the horn and the shoulders flange outwardly the ends of the can-body.

While the flanging is taking place the horn is clamped at a point adjoining the chucks between the fixed jaw 113 and the movable jaw 114 on the lever 115. This lever is operated from the cam-shaft at the proper time by a cam 116, acting on a cam-roller 117, which is carried by the end of the lever.

With a can-body flanged at both ends it is necessary that the jaws of the chucks should have sufficient movement to enable the ends to clear the edges of the flanges in order that the flanged can-body may be removed. This motion of the jaws in opening and closing is effected by circularly-movable plates 118, with cam-slots 119, which receive pins 120, attached to the jaws. These plates are operated by a cam 121. This cam receives a cam-roller 122 on the end of an arm 123. The arm is carried by a rock-shaft 124, which is supported in bearings cast on the vibrator. An arm 125, also carried by the rock-shaft, is connected by a link 126 to the circularly-movable plates of both chucks.

In order that the flanges at the two ends of the can-body may be of equal depth, it is necessary to position the can-body with respect to the chucks with more accuracy than has been found practicable with the feeding devices which feed the can-bodies along the horn past the soldering mechanism. Gaging-fingers 127 are therefore provided. These are supported at the ends of levers 128, which are pivoted to studs 129, carried by one of the chucks. Cams 130 on the circularly-movable plate of this chuck operate the levers, thereby setting the gaging-fingers and positioning the can-body as soon as the jaws start to close. After the can-body has been flanged and the chucks have opened the can-body is again brought into a concentric position with respect to the horn by the springs within the cushion-sleeve, and the can-body is pushed over one of the peripheral flanging-shoulders and off from the free end of the horn.

The finished can-body 131 is shown in Fig. 25 with the matching bead and groove 132 in the lapped ends of the blank and the flanged ends 133 of the can-body.

What we claim as new, and desire to secure by Letters Patent of the United States, is—

1. The combination of a pick-up mechanism for sheet-metal blanks, a support for a pile of blanks under the pick-up mechanism, guides for the pile of blanks on the support, a support for a reserve pile of blanks at the side of the other support, a passage-way between the supports, and a latch in the passage-way, which latch forms one of the guides.

2. The combination of a pick-up mechanism for sheet-metal blanks, a support for the pile of blanks under the pick-up mechanism, guides for the pile of blanks on the support, a support for a reserve pile of blanks at the side of the other support and on a higher level, and a stepped passage-way between the supports.

3. The combination of a pick-up mechanism for sheet-metal blanks, a support for the pile of blanks under the pick-up mechanism, guides for the pile of blanks on the support, a support for a reserve pile of blanks at the side of the other support and on a higher level, a stepped passage-way between the supports, and a latch in the passage-way, which latch forms one of the guides.

4. The combination of a pick-up mechanism for sheet-metal blanks, consisting of devices for seizing the blanks, means for lifting and lowering the pick-up mechanism, a stop for the blanks slightly below the level of the points of contact of the pick-up devices in their raised position, and means for removing the blanks from the pick-up devices.

5. The combination of a pick-up mechanism for sheet-metal blanks consisting of magnets, means for lifting and lowering the magnets, an air-cushion for regulating the approach of the magnets to the blanks, and an adjustable vent for the air-cushion.

6. The combination of a horn, a clamping-bar for clamping sheet-metal body-blanks in contact with the horn, guides for the blanks supported by the clamping-bar, means for operating the clamping-bar, and means for forming can-bodies on the horn.

7. The combination of a horn, a clamping-bar for clamping sheet-metal body-blanks in contact with the horn, curved forming-dies hinged to the clamping-bar, and means for operating the clamping-bar and forming-dies for forming can-bodies on the horn.

8. The combination of a horn, a clamping-bar for clamping sheet-metal body-blanks in contact with the horn, guides for the blanks supported by the clamping-bar, curved forming-dies hinged to the clamping-bar, and means for operating the clamping-bar and forming-dies for forming can-bodies on the horn.

9. The combination of a horn, curved forming-dies, hinged supports for the forming-dies, links connected to the forming-dies, a lever to which the links from both dies are connected, the arrangement of the parts being such that the fulcrum of the lever will be approximately on a projection of a right line passing through the ends of the link connected to one of the dies when the dies are closed around the horn, and the fulcrum of the lever will be approximately on a right line passing through and between the ends of the link connected to the other die when the dies are open, and means for operating the lever.

10. The combination of a horn, curved forming-dies, hinged supports for the forming-dies, links connected to the forming-dies, a lever, a common point on the lever to which the links from both dies are connected, the arrangement of the parts being such that the fulcrum of the lever will be approximately on a projection of a right line passing through the ends of the link connected to one of the dies when the dies are closed around the horn, and the fulcrum of the lever will be approximately on a right line passing through and between the ends of the link connected to the other die when the dies are open, and means for operating the lever.

11. The combination of a horn, a clamping-bar for clamping sheet-metal body-blanks in contact with the horn, curved forming-dies, hinged supports for the forming-dies, links connected to the forming-dies, a cam for operating the clamping-bar and a lever to which the links from both dies are connected, the cam and lever being rigidly connected and mounted on a common pivot, and means for operating the cam and lever.

12. The combination of a horn, a clamping-bar for clamping sheet-metal body-blanks in contact with the horn, curved forming-dies, hinged supports for the forming-dies, links connected to the forming-dies, a cam for operating the clamping-bar, a gear-segment integral with the cam, a lever to which the links from both dies are connected, the cam, gear-segment and lever being rigidly connected and mounted on a common pivot, and means for operating the gear-segment.

13. The combination of a horn, curved forming-dies, hinged supports for the forming-dies, guiding-lugs on the forming-dies, and means for operating the forming-dies for forming can-bodies on the horn.

14. The combination of a horn, a longitudinal groove in the horn, means for folding sheet-metal blanks around the horn and lapping the ends over the groove in the horn, a punch for forming matching beads and grooves in the lapped ends, a confining-piece for the lapped ends supported by the punch, a spring for holding the confining-piece in contact with the lapped ends when the punch is withdrawn, and means for feeding the formed can-bodies along the horn.

15. The combination of a horn, means for forming sheet-metal blanks around the horn and lapping the ends over the horn, a punch for forming matching beads and grooves in the lapped ends, a longitudinal guiding-groove for the formed can-bodies, soldering devices adjoining the horn for the formed can-bodies, means adjoining the guiding-groove and between the punch and soldering devices for confining the lapped ends against the horn, and means for feeding the formed can-bodies along the horn between the punch and soldering devices.

16. The combination of a horn, a longitudinal groove in the horn, means for forming sheet-metal blanks around the horn and lapping the ends over the groove in the horn, a punch for forming matching beads and grooves in the lapped ends, soldering devices adjoining the horn for the formed can-bodies, means adjoining the groove in the horn and between the punch and soldering devices for confining the lapped ends against the horn, and means for feeding the formed can-bodies along the horn between the punch and soldering devices.

17. The combination of a horn, a longitudinal groove in the horn, means for forming sheet-metal blanks around the horn and lapping the ends over the groove in the horn, a punch for forming matching beads and grooves in the lapped ends, soldering devices adjoining the horn for the formed can-bodies, a series of confining-fingers adjoining the groove in the horn and between the punch and soldering devices, and means for feeding the formed can-bodies along the horn between the punch and soldering devices.

18. The combination of a horn for receiving formed can-bodies with lapped ends, a longitudinal guiding-groove for both lapped ends, means adjoining the guiding-groove for confining the lapped ends against the horn, soldering devices adjoining the horn for soldering the formed can-bodies, and means for feeding the formed can-bodies along the horn past the soldering devices.

19. In a machine for soldering the side seams of can-bodies with lapped ends bent to lie together but not locked, the lapped ends having matching beads and grooves and the inner lapped end of each can-body having an inwardly-projecting bead, the combination of a horn, a longitudinal guiding and holding groove in the horn for receiving the matching beads and grooves of the can-bodies, a pressure member adjoining the groove in the horn for holding the matching beads and grooves of the can-bodies in the guiding and holding groove of the horn, soldering devices adjoining the horn for soldering the side seams of the formed can-bodies, and means for feeding the formed can-bodies along the horn past the soldering devices.

20. In a machine for soldering the side seams of can-bodies with lapped ends bent to lie together but not locked, the lapped ends having matching beads and grooves and the inner lapped end of each can-body having an inwardly-projecting bead, the combination of a horn, a longitudinal guiding and holding groove in the horn for receiving the matching beads and grooves of the can-bodies, a series of confining-fingers adjoining the groove in the horn for holding the matching beads and grooves of the can-bodies in the guiding and holding groove of the horn, soldering devices adjoining the horn for soldering the side seams of the formed can-bodies, and means for feeding the formed can-bodies along the horn past the soldering devices.

21. The combination of a horn, means for forming can-bodies around the horn, a soldering device, a longitudinally-adjustable solder-feeding device and a support on which the solder-feeding device is adjustable parallel with the horn, and means for feeding can-bodies along the horn.

22. The combination of a horn for receiving can-bodies, a soldering device, a plurality of longitudinally-adjustable solder-feeding devices and a support on which the solder-feeding devices are independently adjustable parallel with the horn, and means for feeding can-bodies along the horn.

23. The combination of a horn, means for forming can-bodies around the horn, a soldering device, a plurality of longitudinally-adjustable solder-feeding devices and a support on which the solder-feeding devices are independently adjustable parallel with the horn, and means for feeding can-bodies along the horn.

24. A solder-feeding device consisting of a reciprocating part, jaws carried by the reciprocating part, one of which is movable with respect to the reciprocating part, means for adjusting the amount of opening of the jaws, and means applied to the movable jaw for operating successively the jaws and reciprocating part.

25. A solder-feeding device consisting of a lever, a pair of jaws carried by the lever, one of which is movable with respect to the lever, means for adjusting the amout of opening of the jaws, and means applied to the movable jaw for operating successively the jaws and the lever.

26. The herein-described coöperating parts consisting of a chuck for holding a can-body and a device for flanging the end of the can-body, the axes of the coöperating parts being normally coincident, in combination with separate means for vibrating one of the coöperating parts along two axes at right angles to the axes of the coöperating parts without rotating either coöperating part.

27. The herein-described coöperating parts consisting of a chuck for holding a can-body and a device for flanging the end of the can-body, the axes of the coöperating parts being normally coincident, in combination with means for imparting a circular vibratory motion to one of the coöperating parts shifting its axis about the axis of the other part, and means for preventing the bodily rotation of both coöperating parts.

28. The herein-described coöperating parts consisting of a chuck for holding a can-body and a horn for receiving the can-body provided with means for flanging the end of the can-body, the axes of the coöperating parts being normally coincident, in combination with means for imparting a circular vibratory motion to one of the coöperating parts shifting its axis about the axis of the other part, and means for preventing the bodily rotation of both coöperating parts.

29. The herein-described coöperating parts consisting of a chuck for holding a can-body and a horn provided with means for flanging the end of the can-body, the axes of the coöperating parts being normally coincident, in combination with means for imparting a circular vibratory motion to one of the coöperating parts shifting its axis about the axis of the other part, means for preventing the bodily rotation of both coöperating parts, and means for forming can-bodies from can-body blanks around the horn and forming the seams thereof.

30. The herein-described coöperating parts consisting of a chuck for holding a can-body and a horn for receiving the can-body provided with flanging-shoulders and a recess between the shoulders, the axes of the coöperating parts being normally coincident, in combination with means for imparting a circular vibratory motion to one of the coöperating parts shifting its axis about the axis of the other part.

31. The herein-described coöperating parts consisting of a chuck for holding a can-body and a horn for receiving the can-body provided with flanging-shoulders, a recess between the shoulders and a suitably-supported cushion-sleeve located within the recess, the axes of the coöperating parts being normally coincident, in combination with means for imparting a circular vibratory motion to one of the coöperating parts shifting its axis about the axis of the other part.

32. The herein-described coöperating parts consisting of a chuck for holding a can-body and a horn for receiving the can-body provided with flanging-shoulders, a recess between the shoulders, a cushion-sleeve located within the recess, and spring-supports between the recess in the horn and the sleeve, the axes of the coöperating parts being normally coincident, in combination with means for imparting a circular vibratory motion to one of the coöperating parts shifting its axis about the axis of the other part.

33. The herein-described coöperating parts consisting of a chuck for holding a can-body and a device for flanging the end of the can-body, the axes of the coöperating parts being normally coincident, in combination with means for closing the chuck and means for imparting a circular vibratory motion to one of the coöperating parts shifting its axis about the axis of the other part.

34. The herein-described coöperating parts consisting of a chuck for holding a can-body and a horn for receiving the can-body provided with means for flanging the end of the can-body, the axes of the coöperating parts being normally coincident, in combination with means for closing the chuck and means for imparting a circular vibratory motion to one of the coöperating parts shifting its axis about the axis of the other part.

35. The herein-described coöperating parts consisting of a chuck for holding a can-body and a horn for receiving the can-body provided with flanging-shoulders, a recess between the shoulders and a suitably-supported cushion-sleeve located within the recess, the axes of the coöperating parts being normally coincident, in combination with means for closing the chuck and means for imparting a circular vibratory motion to one of the coöperating parts shifting its axis about the axis of the other part.

36. A suitably-supported horn for receiving can-bodies which is provided with two facing peripheral flanging-shoulders located between the point of support for the horn and its free end, and means for forcing the can-bodies between the flanging-shoulders.

37. A suitably-supported horn for receiving can-bodies which is provided with two facing peripheral flanging-shoulders and a recess between the shoulders, all of which are located between the point of support for the horn and its free end, and means for forcing the can-bodies between the flanging-shoulders.

38. A suitably-supported horn for receiving can-bodies which is provided with two facing peripheral flanging-shoulders, a recess between the shoulders and a suitably-mounted cushion-sleeve located within the recess, all of which are located between the point of support for the horn and its free end, and means for forcing the can-bodies between the flanging-shoulders.

39. A suitably-supported horn for receiving can-bodies which is provided with two facing peripheral flanging-shoulders, a recess between the shoulders, and a suitably-mounted cushion-sleeve located within the recess and between the shoulders, all of which are located between the point of support for the horn and its free end, and means for forcing the can-bodies between the flanging-shoulders.

40. A horn for receiving can-bodies provided with flanging-shoulders, a recess between the shoulders, a suitably-mounted cushion-sleeve located within the recess, and confined between the shoulders against longitudinal movement.

41. A chuck for receiving can-bodies and simultaneously engaging all parts of the periphery of a can-body, and separate means for vibrating the chuck along two axes at right angles to the axis of the chuck.

42. A chuck for receiving can-bodies and simultaneously engaging all parts of the periphery of a can-body, and separate means for vibrating the chuck along two axes at right angles to each other and at right angles to the axis of the chuck.

43. A chuck for receiving can-bodies and simultaneously engaging all parts of the periphery of a can-body, and separate cams for vibrating the chuck along two axes at right angles to each other and at right angles to the axis of the chuck.

44. A chuck for receiving can-bodies, means for imparting a circular vibratory motion to the chuck, gaging-fingers supported by the chuck and means for setting the gaging-fingers.

45. A chuck for receiving can-bodies, in combination with means for closing the chuck, and means for imparting a circular vibratory motion to the chuck shifting its axis without rotating the chuck.

46. A chuck for receiving can-bodies in combination with means for closing the chuck, means for imparting a circular vibratory motion to the chuck, gaging-fingers supported by the chuck, and means for setting the gaging-fingers.

Signed in the borough of Brooklyn, city of New York, N. Y., this 18th day of March, 1902.

BENJAMIN ADRIANCE.
AMOS CALLESON.

Witnesses:
SAMUEL W. BALCH,
WILLIAM C. HORN.